United States Patent

Blonn, Sr.

[11] 3,842,653
[45] Oct. 22, 1974

[54] REVERSING, THROTTLE AND BRAKE CONTROLLER WITH INTERLOCKS

[75] Inventor: George W. Blonn, Sr., Downers Grove, Ill.

[73] Assignee: General Motors Corporation, Detroit, Mich.

[22] Filed: Feb. 19, 1974

[21] Appl. No.: 443,474

[52] U.S. Cl. ............... 74/878, 74/483 R, 200/5 B, 192/.094
[51] Int. Cl. ...................... B60k 29/00, B60k 21/00
[58] Field of Search ............ 192/.094, .098; 74/878, 74/483 R, 483 K; 200/5 R, 5 B, 5 C

[56] References Cited
UNITED STATES PATENTS

| | | | |
|---|---|---|---|
| 2,784,265 | 3/1957 | Weide | 74/483 X |
| 3,131,575 | 5/1964 | Shimanckas | 192/.098 X |
| 3,410,151 | 11/1968 | Adams et al. | 200/50 C |

*Primary Examiner*—Benjamin W. Wyche
*Attorney, Agent, or Firm*—Robert J. Outland

[57] ABSTRACT

A locomotive controller having throttle, direction and dynamic brake controls which are interlocked to prevent improper movements. The throttle and direction controls oscillate on a common axis. A locking mechanism is carried by the direction control mechanism and actuated by installation and removal of the direction control actuating reverser handle. Removal of the reverser handle engages the locking mechanism with the housing cover and the throttle control mechanism, locking the throttle and direction controls to the housing. The dynamic brake control is also locked in position through interlocking with the other two mechanisms. The controls are unlocked by replacing the reverser handle in its carrier. The entire controller assembly is mounted on a hinged mounting plate to facilitate access for installation and servicing.

6 Claims, 14 Drawing Figures

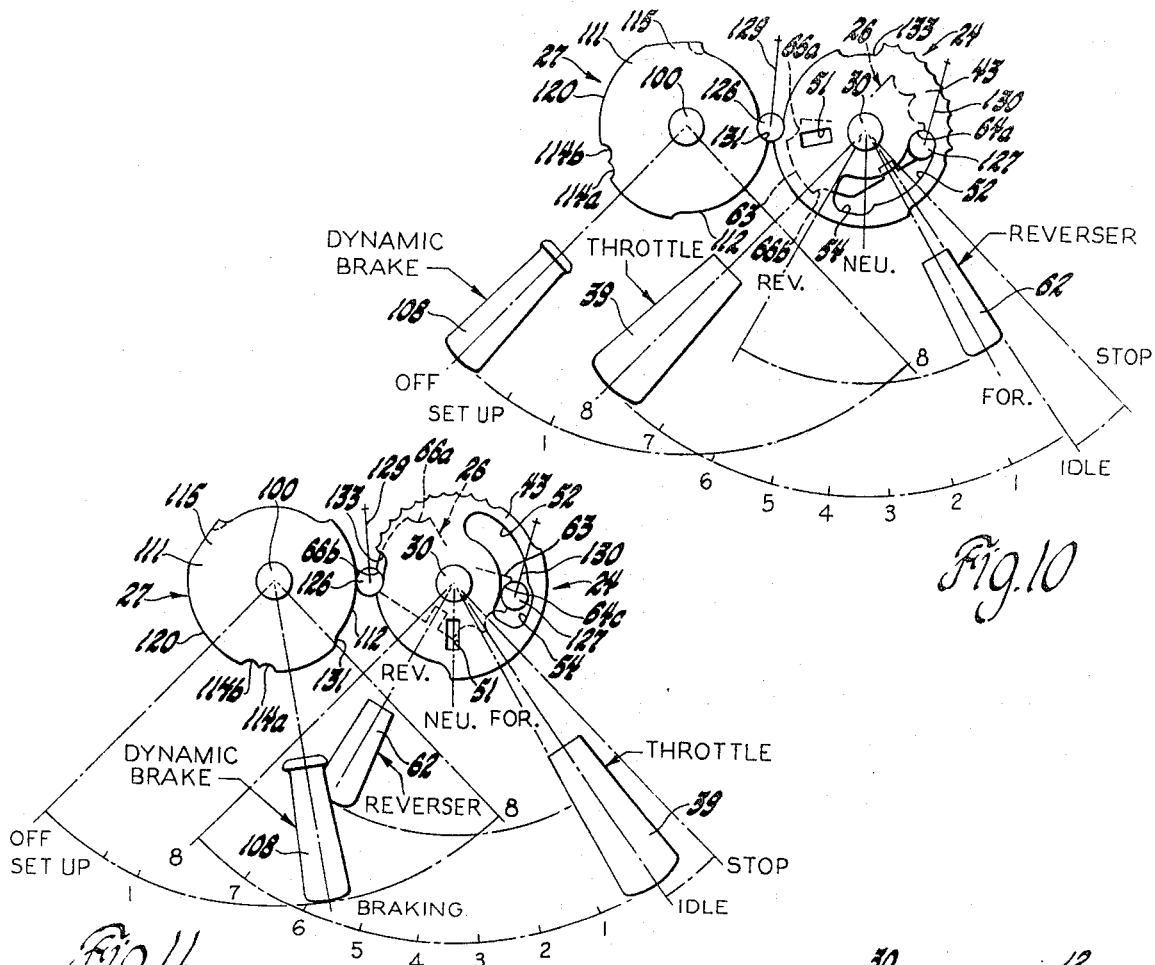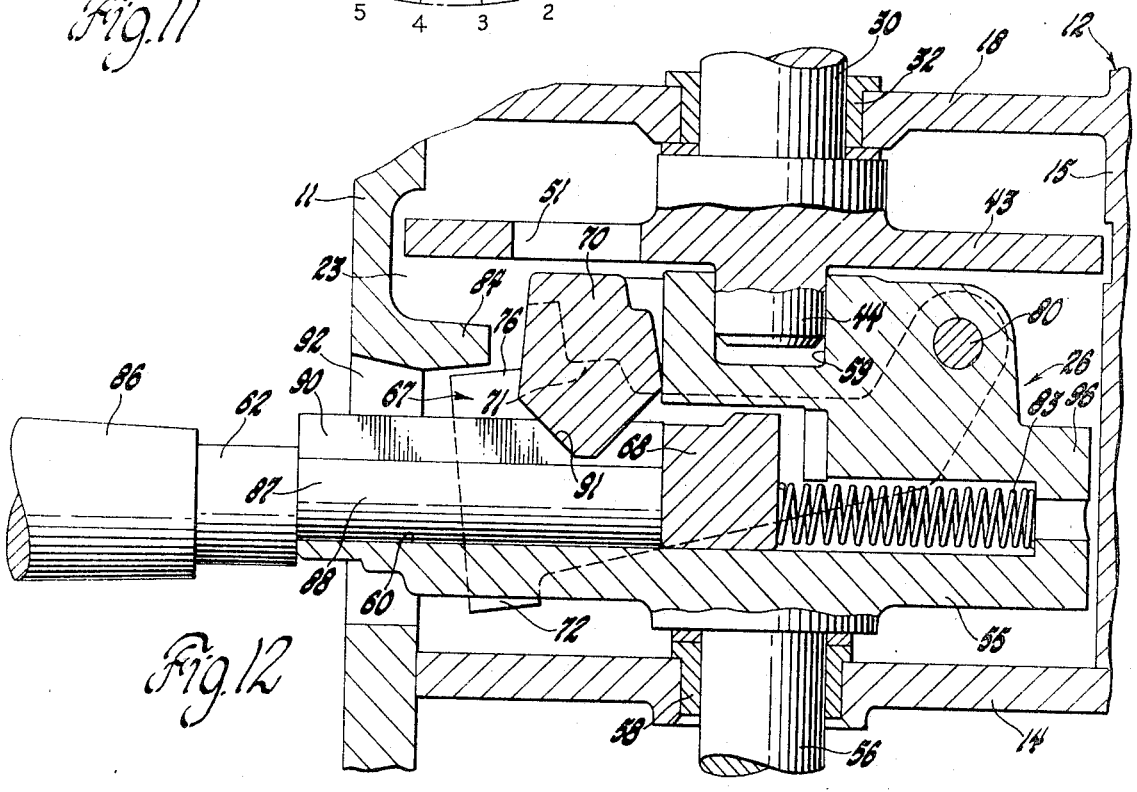

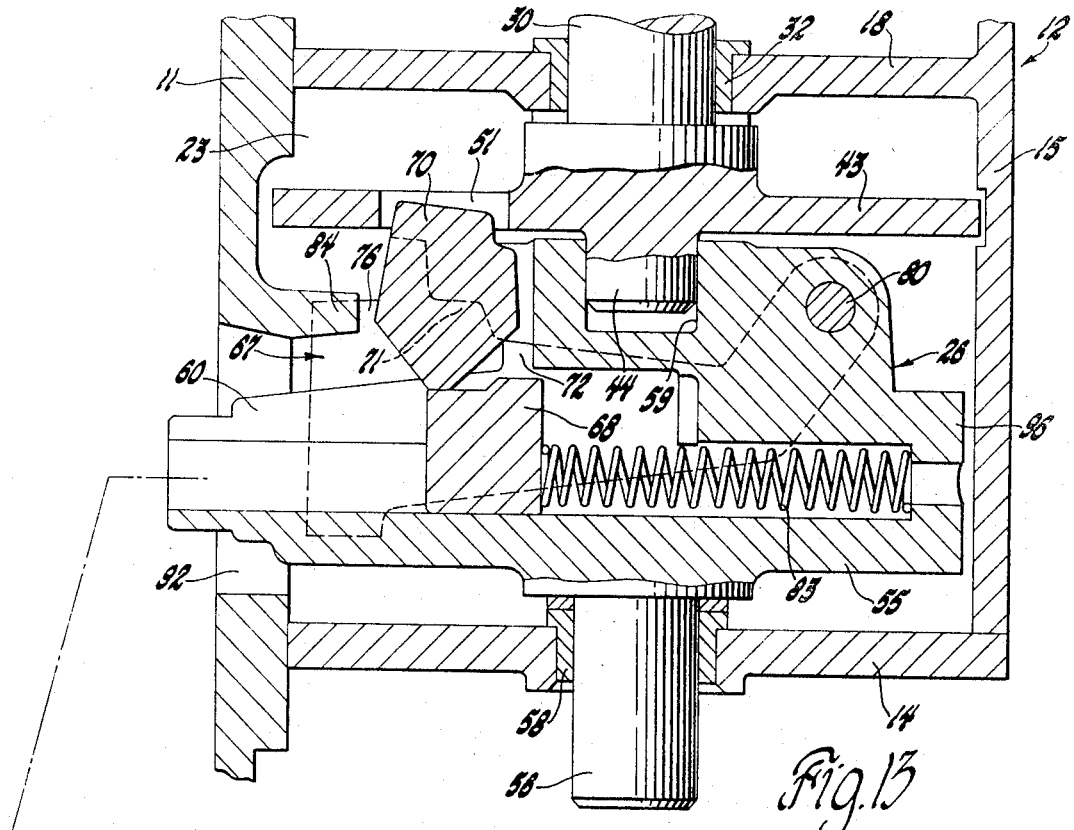
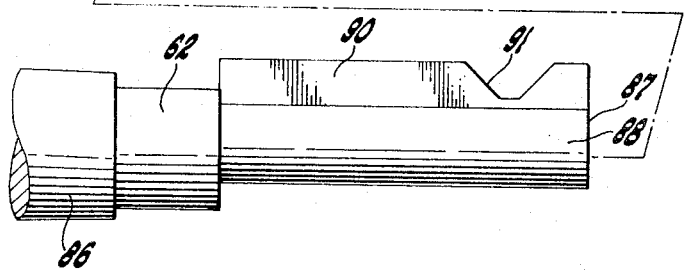
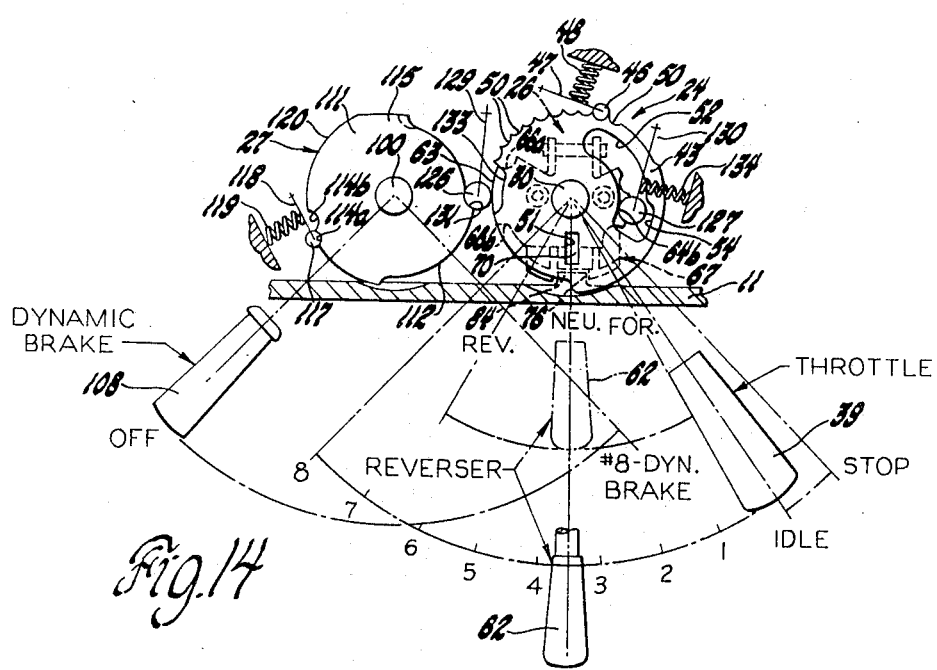

REVERSING, THROTTLE AND BRAKE CONTROLLER WITH INTERLOCKS

FIELD OF THE INVENTION

This invention relates to electro-mechanical controllers and, more particularly, to master controllers for diesel electric locomotives and the like.

BACKGROUND OF THE INVENTION

The master controllers of diesel-electric locomotives, and other similar vehicles, provide for control by the operator of a large number of operating devices utilized for driving and stopping the associated locomotive or train. The mechanisms of such controllers commonly include a throttle control for controlling the power output of the locomotive, a direction control (reverser) for controlling the direction of movement of the locomotive and a dynamic brake control for controlling the braking action of the dynamic brakes, if provided. These controls are actuated by suitable operating handles and are generally interlocked to prevent improper operation of the control mechanisms relative to one another. In addition, a locking mechanism is generally provided which locks the controls in non-operating position upon removal of the reverser handle from the controller. Control mechanisms having the above described features are shown, for example, in U.S. Pat. Nos. 2,409,762 Janes and 2,784,265 Weide, both assigned to the assignee of the present invention.

In order to promote standardization of railroad diesel locomotive control stands. The Association of American Railroads recommended adoption of a standard control arrangement by the various builders. This standardized controller arrangement includes the use of separate throttle, reverser and dynamic brake handles for actuating the various controls, as well as establishing certain desired locking and interlocking functions.

SUMMARY OF THE INVENTION

The present invention provides a railway locomotive controller which conforms to the AAR standard through the provision of simplified, yet highly effective control interlocking and locking mechanisms.

It is a feature of the invention that the throttle control mechanism and the direction control mechanism are arranged for oscillation on a common axis and are interlocked through a single roller device engagable with both mechanisms. Another feature of the invention is that a dynamic brake control mechanism is arranged on a second axis spaced from the axis of the throttle and direction controls and interlocked with both through a second roller device engagable with all three mechanisms.

A further feature of the invention is the provision of locking means carried by the direction control mechanism and engagable with the throttle control mechanism and the controller housing for locking the controls in an inoperative position. A still further feature is that the interlocking mechanism between the dynamic brake control and the other control mechanisms acts to lock the dynamic brake control in its Off position when the other controls are locked.

An additional feature of the invention is that the various control mechanisms are mounted in a housing which is fixed to a mounting plate forming the front cover of the housing and attachable to a control stand by a hinge arranged so that access to the rear of controller assembly for installation and servicing is facilitated.

These, as well as many additional features and advantages of the invention, will be more fully understood from the following description of the preferred embodiment of controller made according to the invention, taken together with the accompanying drawings.

BRIEF DESCRIPTION OF THE DRAWINGS

In the drawings:

FIGS. 9, 10 and 11 are diagrammatic views illustrating the operation of the controls and their interlocking mechanisms;

FIGS. 12 and 13 are cross-sectional views through the directional control mechanism illustrating the positions of the locking mechanism in unlocked and locked positions, respectively; and FIG. 14 is a diagrammatic view of the portions of the control mechanisms illustrating the operation of the detent means in conjunction with the interlocking and locking mechanisms of the controller.

DESCRIPTION OF THE PREFERRED EMBODIMENT

Figure 1:
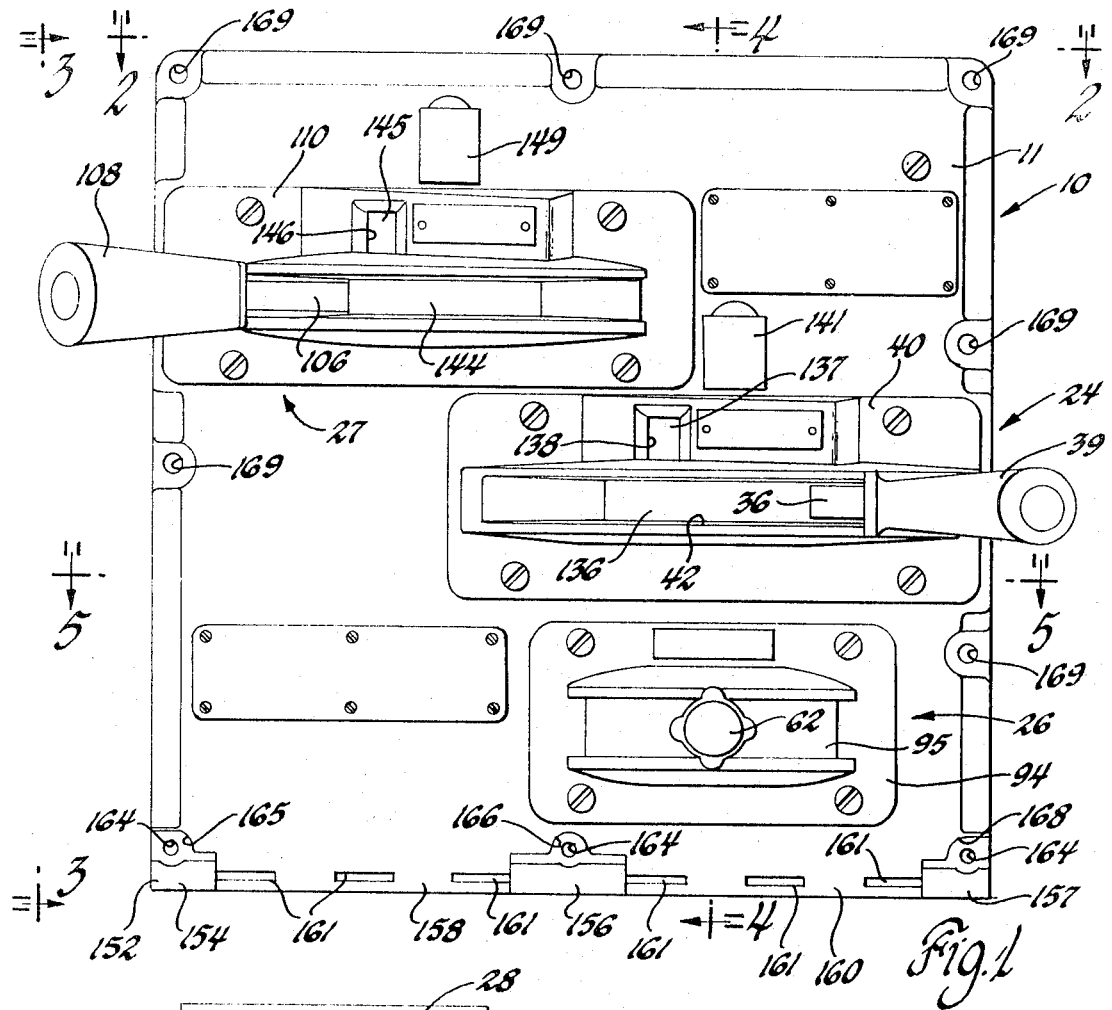
FIG. 1 is a front view of a preferred embodiment of a locomotive controller according to the present invention.
Figure 2:
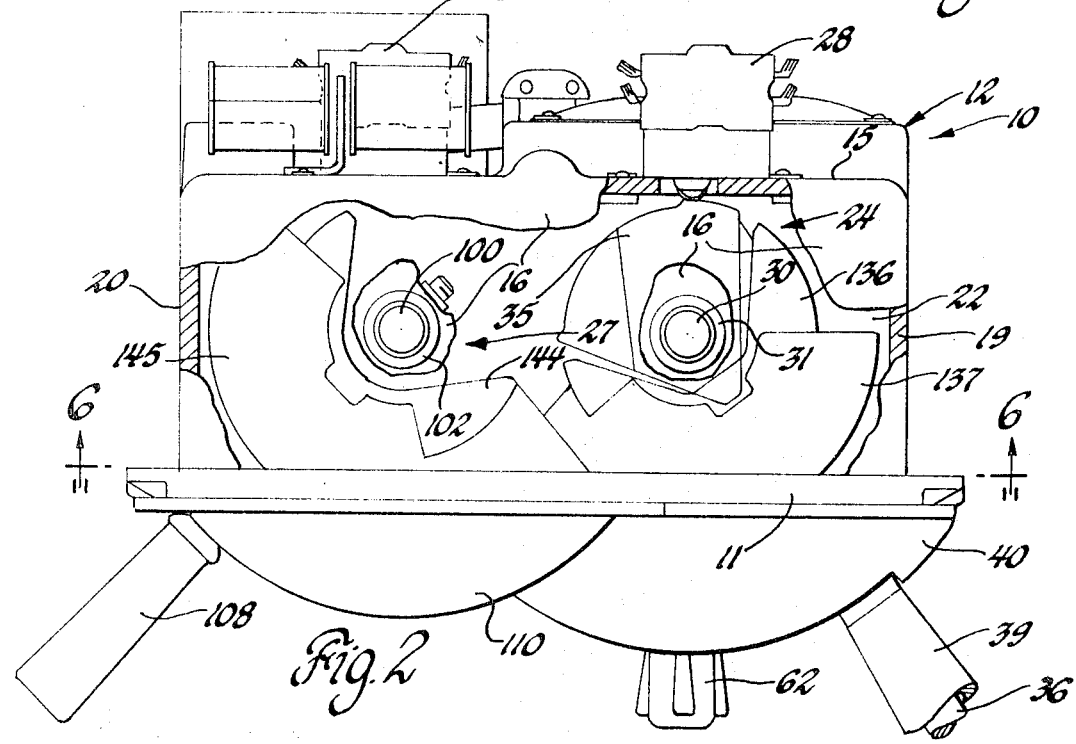
FIG. 2 is a top view of the controller as viewed from the plane indicated by the line 2—2 of FIG. 1 and having portions of the housing top wall removed.

Referring to the drawings in detail, there is shown a controller assembly generally indicated by numeral 10. Controller 10 has a housing, including a front mounting plate 11, a rear enclosure 12, and a bottom plate 14. The rear enclosure 12 includes a rear wall 15 which integrally connects with a top wall 16, an intermediate wall 18, and right and left side walls 19 and 20, respectively.

The rear enclosure 12, the bottom plate 14, and the front mounting plate 11, assembled, form the housing which encloses adjacent upper and lower cavities 22, 23, respectively, in which are disposed a throttle control mechanism 24, a direction control mechanism 26 and a dynamic braking control mechanism 27. A plurality of electrical switches 28 adapted for connection in the control circuits of an associated locomotive are mounted on the rear wall 15 of the controller housing for actuation by the various mechanisms of the controller.

The throttle control mechanism 24 includes a vertically extending axle 30 which is journaled in bearings 31, 32, disposed in the upper and intermediate walls 16, 18, respectively, and supported on a needle bearing 34 for oscillation about its vertical axis. Axle 30 carries a throttle cam 35 having a plurality of cam surfaces adapted to engage certain of the switches 28 in known manner upon rotation of the axle 30 to various predetermined positions. Near intermediate wall 18 a throttle shaft 36 is secured to the throttle axle 30 and extends through an elongated opening 38 in the front mounting plate 11. A plastic throttle handle 39 is fixed to the end of the throttle shaft 36 for moving the throttle axle. An escutcheon plate 40 covers the opening 38 and provides a horizontally elongated slot 42 for permitting movement of the throttle shaft 36 through the allowed range of oscillation of the throttle control mechanism.

At the bottom end of the throttle axle 30 there is formed a radially extending throttle detent and interlock cam plate 43, adjacent which there is an axially extending guide lug 44 at the very end of the axle 30. Plate 43 is engaged by a detent roller 46, carried by a detent clevis 47 which is biased by a spring 48 into engagement with any of ten adjacent recesses 50 in the plate 43, thereby acting to maintain the throttle control mechanism in any of ten predetermined operating positions. The throttle operating positions include Stop and Idle positions as well as eight sequential powered Throttle positions. The throttle cam plate 43 is also provided with a lock receiving opening 51 and an arcuate cam cutout 52 having wider portion 54 at one end for purposes to be subsequently described.

The direction control mechanism comprises a handle carrier 55 which is oscillatably supported in the lower cavity 23 of the housing by a vertical guide stub 56 journaled in a bearing 58 in the bottom plate 14 and by an upper guide recess 59 which encloses and bears on the guide lug 44. The handle carrier has a key-shaped slot 60 for receiving a removable reverser handle 62. A reverser detent and interlock cam plate 63 is formed integrally with the upper portion of the handle carrier 55 and includes adjacent detent recesses 64a, b, c on one side and spaced interlock recesses 66a, b on the other side for subsequently to be described purposes.

Figure 8:
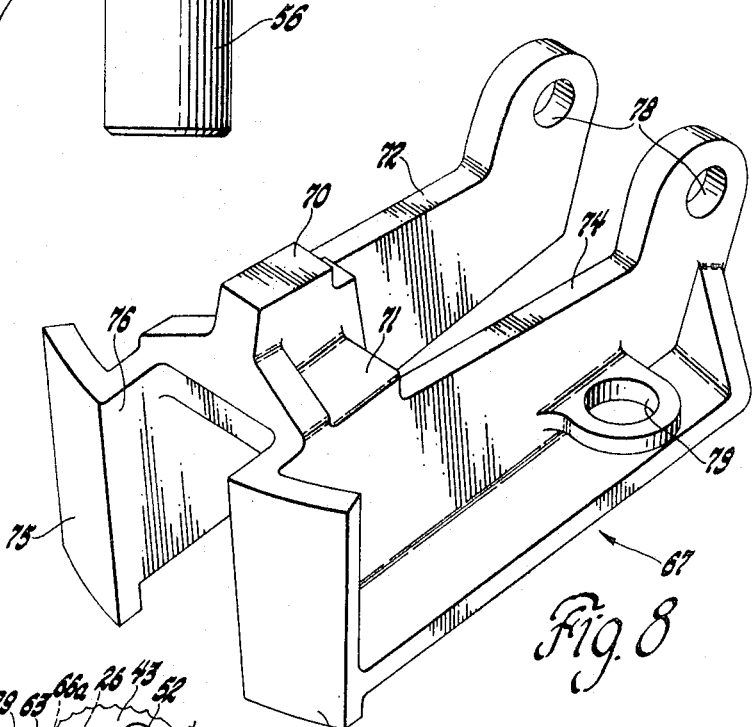
FIG. 8 is a pictorial view of the locking bracket used with the handle carrier assembly of FIG. 7.

The handle carrier also supports a lock mechanism including a locking bracket 67 and a locking slug 68. The locking bracket 67, as best shown in FIG. 8, has a central vertical lug 70 supported on a web 71 which joins a pair of generally parallel arms 72, 74. The arms 72, 74 terminate at one of their ends in arcuate guide surfaces 75 that are spaced apart to form a tab receiving recess 76. At their other ends, the arms include spaced pin receiving openings 78 and spring seats 79.

Figure 4:
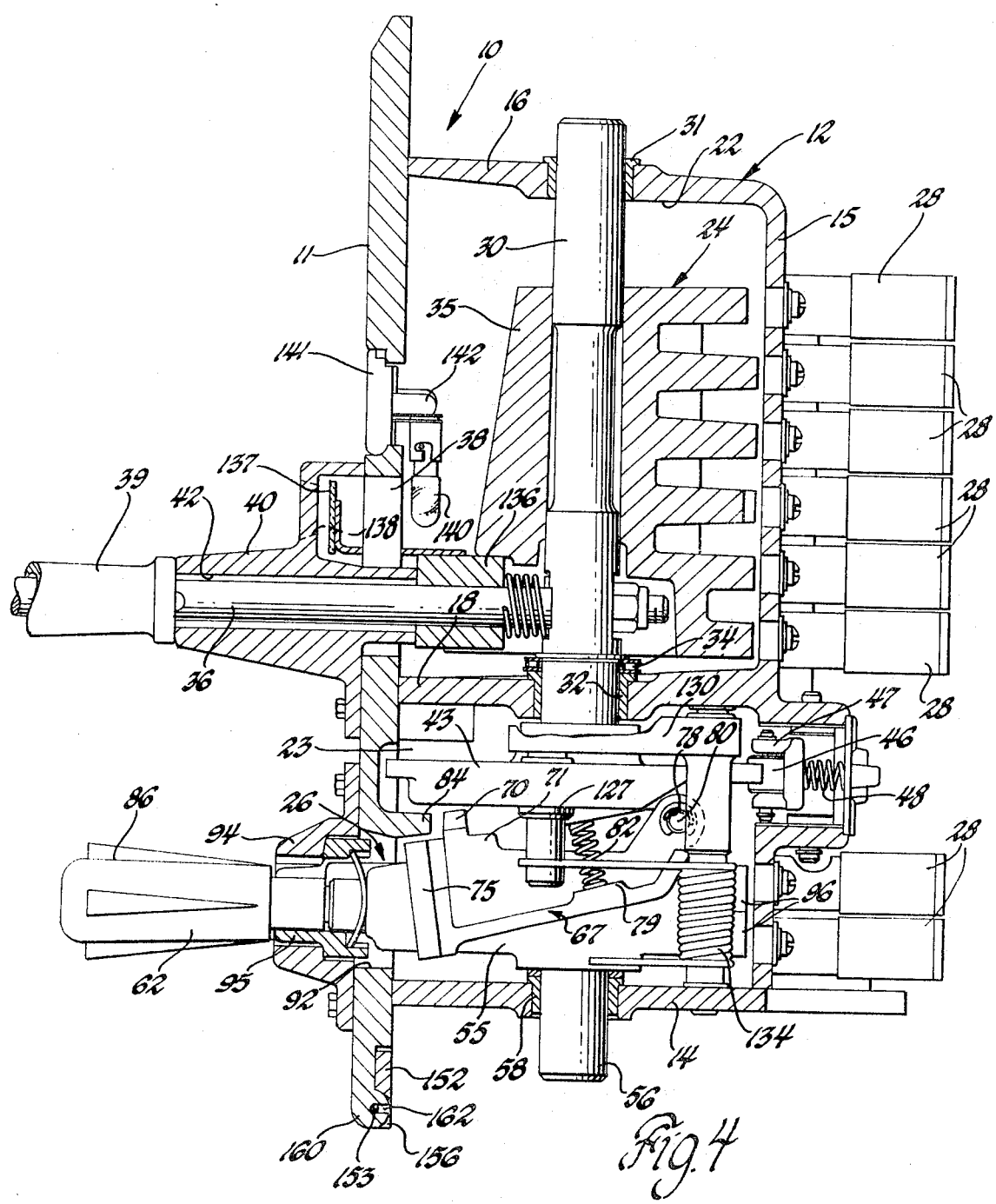
FIG. 4 is a vertical cross-sectional view in the direction of the arrows from the plane of the line 4—4 of FIG. 1 and showing details of the throttle and direction control mechanisms.
Figure 5:
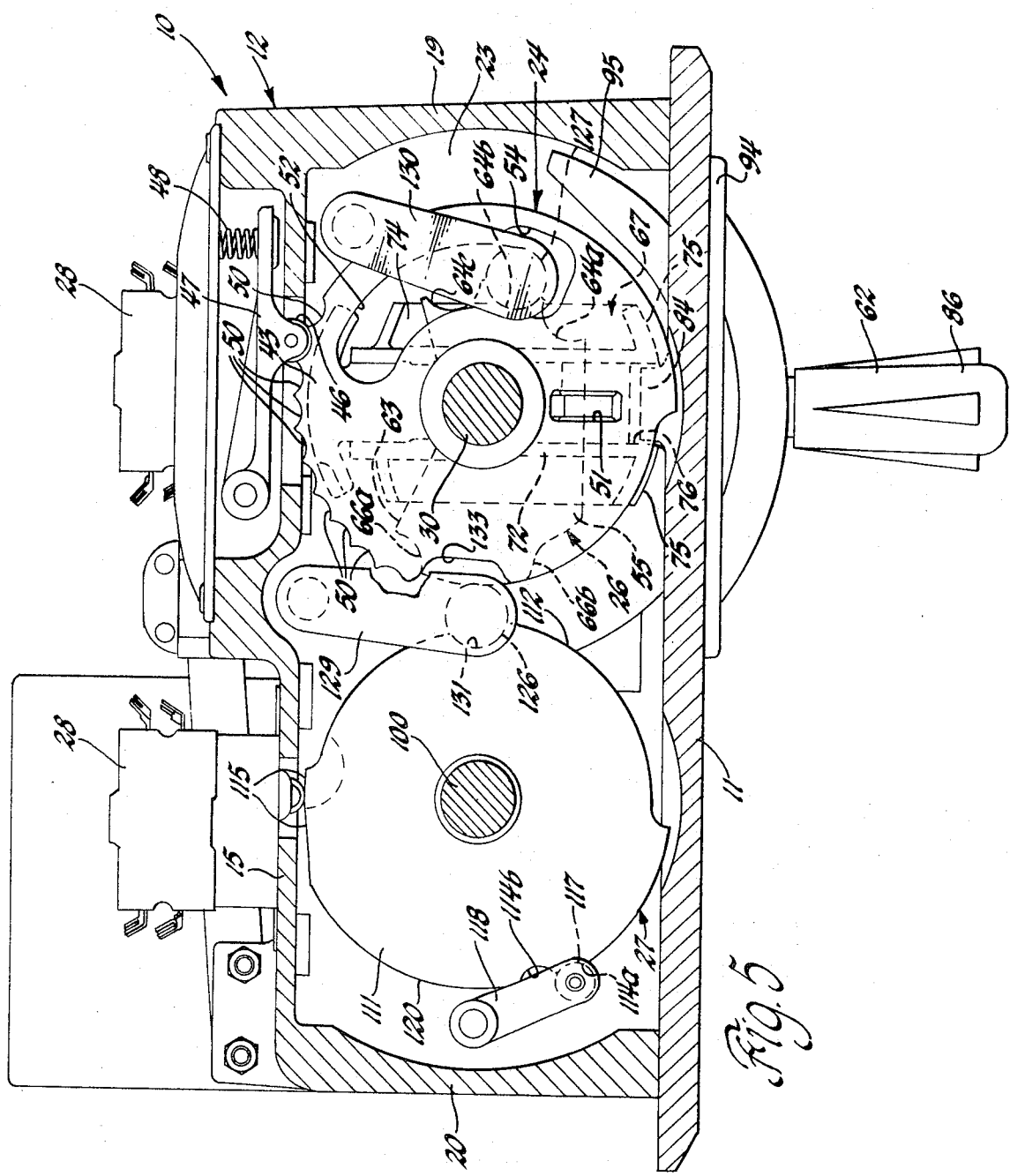
FIG. 5 is a transverse cross-sectional view from the plane of the line 5—5 of FIG. 1 as viewed in the direction of the arrows and illustrating portions of the locking and interlocking means for the various control mechanisms.
Figure 6:
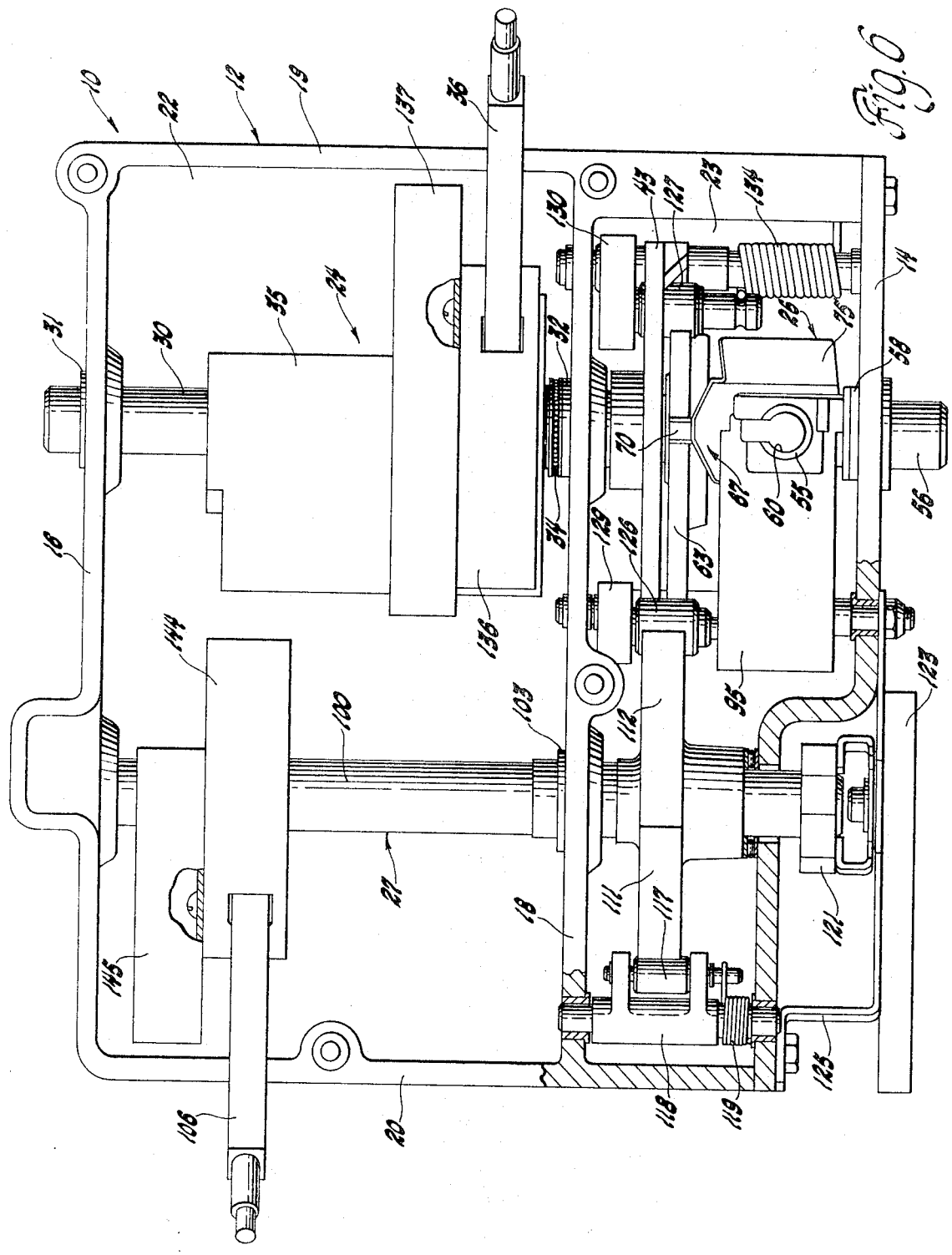
FIG. 6 is a vertical cross-sectional view from the plane indicated by the line 6—6 of FIG. 2, showing the internal components of the controller behind the front mounting plate.

The locking bracket 67 is pivotally secured to the handle carrier 55 by a pin 80 which extends horizontally through openings 78 of the bracket. Coil springs 82 extend between the springs seats 79 of the bracket and the lower surface of the reverser cam plate 63, acting to bias the locking bracket 67 downwardly to the unlocked position, as shown in FIGS. 4 and 12.

Figure 7:
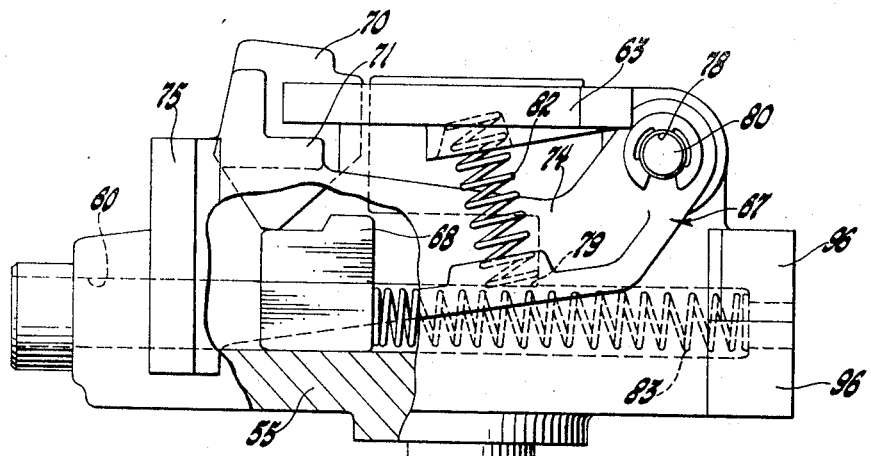
FIG. 7 is a side view of the handle carrier assembly portion of the direction control mechanism having a portion broken away to illustrate a portion of the locking device.

The locking slug 68 is slidably received within the slot 60 of the handle carrier 55, which is between the arms 72, 74 of the locking bracket 67. A coil spring 83 retained within handle carrier biases the locking slug 68 toward the position shown in FIG. 7 where it extends underneath the web 71, engaging a V-shaped lower extension of the lug 70 and holding the locking bracket upwardly in its locked position, as shown in FIGS. 7 and 13.

In the locked position of the locking bracket 67, lug 70 is received within the opening 51 of the throttle cam plate 43, locking the throttle and direction control mechanisms against movement relative to one another. At the same time, the arcuate guide surfaces 75 of the locking bracket straddle a locking tab 84 which extends rearwardly from the front mounting plate into the recess 76. This locks the direction control mechanism against movement within the housing as will subsequently be more fully described. The reverser handle 62 includes a metal body having a plastic hand grip 86 on one end and a key-shaped portion 87 on the other. Portion 87 includes a cylindrical section 88 with a rectangular cam section 90 along one side. Near the end of the cam section is a V-shaped recess 91 formed in the shape of and adapted to mate with the lower portions of the central lug 70 of the locking bracket for purposes to be subsequently described.

Reverser handle 62 and the outer end of the handle carrier 55 extend through an elongated opening 92 in the front mounting plate 11. A slotted escutcheon 94 is secured to the mounting plate 11 to cover this opening. A spring biased guide member 95 receives the handle and is in turn received within the escutcheon to close the portions of the slot adjacent the handle as the direction control is moved to its various positions.

The direction control mechanism is adapted to be moved into arcuately spaced Forward and Reverse positions and an intermediate Neutral position. The handle carrier 55 includes cam portions 96 which are adapted to actuate certain of the electric switches 28 in the Forward and Reverse positions in order to control the operating direction of the locomotive.

The dynamic brake control mechanism 27 includes an axle 100 which is oscillatably journaled in aligned bearings 102, 103, disposed in the top and intermediate walls, respectively, of the housing. A brake actuating shaft 106 is secured to the axle 100 and extends through an opening 107 in the front mounting plate of the controller housing. A plastic handle 108 is mounted on the end of the shaft 106 for moving the dynamic brake mechanism through its permitted range of oscillation. The opening 107 is closed by an escutcheon plate 110 similar to that utilized with the throttle control.

In the portion of the brake control axle 100 that extends between the intermediate wall 18 and the bottom plate 14, a combination detent and interlock cam plate 111 is integrally formed. Cam plate 111 carries on its outer periphery an interlock cam portion 112, a pair of detent recesses 114a, b and a pair of cams 115 which actuate certain of the electrical switches 28 mounted on the rear wall of the controller. A brake detent roller 117 is supported by a clevis 118 that is pivotally journaled in the intermediate wall 18 and bottom plate 14.

The detent roller 117 is biased into engagement with the cam plate 111 by a torsion spring 119.

The dynamic brake control is movable from an extreme Off position to an adjacent Setup position and then through a range of arcuate movement for varying the degree of braking obtained. Detent roller 117 engages the recesses 114a, b when the brake control is in the Off or Setup positions. During the remainder of the motion, the roller rides on an arcuate edge portion 120 of the cam plate 111 so that this portion of the movement is free of detent action.

A portion of the dynamic brake axle 100 which extends below the bottom plate 14 carries an attaching element 121. This element is connected through suitable mechanism with the movable finger 122 of a dynamic brake rheostat 123 that is supported by a bracket 125 secured to the bottom plate 14.

In order to prevent improper operation of the control mechanism, the controller is provided with two interlock rollers 126 and 127. The rollers are rotatably supported on support arms 129 and 130, respectively, which are pivotally secured between the intermediate wall 18 and the bottom plate 14.

Interlock roller 126 is disposed between the dynamic brake control cam plate 111 on one side and the throttle and reverser cam plates 43, 63 on the other side and is adapted to engage the surfaces of all three plates. In this regard, dynamic brake cam plate 11 has a recess 131 which is engagable by roller 126 in the brake Off position. The throttle cam plate 43 has a recess 133 which is engagable by the roller 126 in the throttle Idle and Stop positions. In addition, recesses 66a and 66b of the reverser cam plate 63 are engagable by the roller 126 in the Forward and Reverse positions, respectively, of the direction control mechanism.

In the remaining positions of each control, roller 126 engages arcuate cam portions of each cam plate which require that the roller be engaged with a recess of the opposite cam plate or plates. For this reason, the dynamic brake control cannot be moved out of the Off position unless the throttle is in Idle or Stop and the reverser handle of the direction control mechanism is in Forward or Reverse. Likewise, if the dynamic brake control is out of its Off position, the reverser lever cannot be moved from its Forward or Reverse positions and the throttle cannot be advanced beyond the Idle position.

Interlock roller 127 extends through and is engagable with the sides of the arcuate cam cutout 52 of the throttle cam plate 43. When the throttle is in its Idle or Stop positions, roller 127 is opposite the wider portion 54 of the cutout and may move outwardly at these points. Roller 127 is also engagable with recesses 64a, b and c of the reverser cam plate 63 when the direction control mechanism is in its Forward, Neutral and Reverse positions, respectively. A torsion spring 134 engages the support arm 130 and biases roller 127 into engagement with the recesses 64a, b, c and, thus, causes the roller to act as a detent, maintaining the reverser handle in one of the three positions. In addition, roller 127 interlocks the throttle and direction control mechanisms to permit movement of the reverser handle only when the throttle is in its Idle or Stop positions, when the roller is opposite the wider portion 54 of the cam cutout 52.

Figure 9:
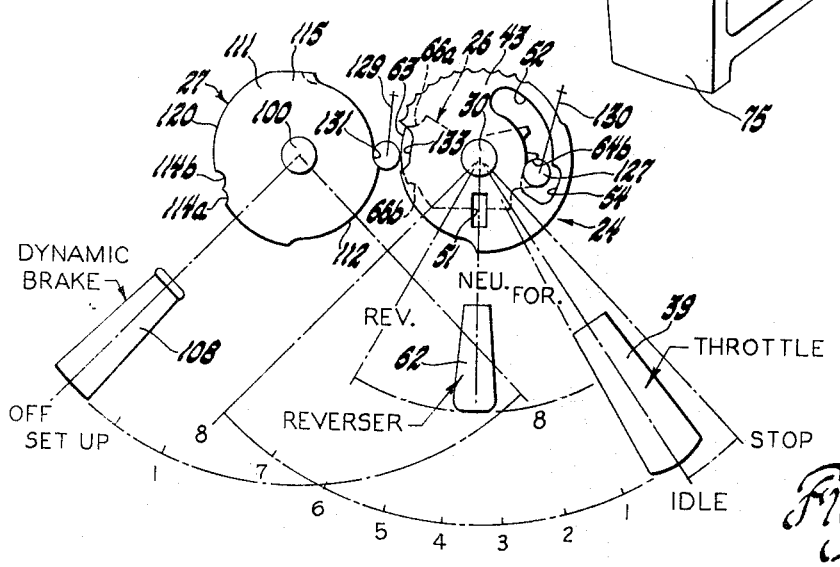

The operation of the controller mechanism is best described by reference to FIGS. 9-14. Reference will first be made to FIGS. 9-11 for explanation of the movement of the control handle and operation of the interlock means.

FIG. 9 shows the controller handles and mechanism in a normally non-operating position in which the associated locomotive would be stopped. The throttle handle 39 is in the Idle position so that the endine may be started and run. However, the reverser handle 62 is in the Neutral position so that the locomotive may not be moved under power. In these positions, interlock roller 126 is prevented by engagement with the reverser cam plate 63 from moving rightwardly and, thus, the dynamic brake handle is blocked in its Off position. Since roller 127 is opposite the wider portion 54 of the throttle cam plate cutout 52, roller 127 may move outwardly (to the right) so that the reverser may be moved to any of its three positions. Alternatively, the throttle may be advanced with the dynamic brake lever in the position shown and he reverser lever in any of its positions.

In FIG. 10, the controls are shown in one of the positions for forward movement of the locomotive. The reverser handle 62 has been moved to the Forward position, causing roller 126 to be opposite recess 66a of the reverser cam plate 63. However, the throttle handle 39 has been advanced clockwise to the Run 8 position, causing the throttle cam plate 43 to engage roller 126 and prevent its rightward movement. This prevents movement of the dynamic brake handle 108 out of the Off position. In addition, advancing the throttle handle moves the throttle plate cam cutout 52 so that roller 127 is prevented from moving out of recess 64a of the reverser cam plate 63. Thus, the reverser handle 62 cannot be moved out of the Forward position until the throttle is returned to Idle. The throttle and dynamic brake handles would be operable in the same manner if the reverser handle were in the Reverse position.

FIG. 11 shows the control handles in one of the positions which could occur during dynamic braking of the locomotive. The throttle handle 39 is in the Idle position, the reverser handle 62 is in Reverse, and the dynamic brake handle 108 is advanced counterclockwise to a position calling for partial application of dynamic braking to the locomotive. With the advancing of the dynamic brake handle, roller 126 is forced to the right into recess 66b of the reverser cam plate and recess 133 of the throttle plate, thus preventing the reverser handle 62 from being moved out of the Reverse position and the throttle handle 39 from being advanced from the Idle position. In the same manner, if the reverser handle 62 were in the Forward position and the dynamic brake was applied, the reverser handle could not then be moved out of the Forward position during dynamic brake application.

The operation of the controller locking mechanism is best illustrated by reference to FIGS. 12-14. FIGS. 12 and 13 show cross-sectional views of the pertinent portions of the controller with the locking mechanism in the unlocked and locked positions, respectively.

In FIG. 12, the handle 62 is in its operational position in the controller with the key-shaped portion 88 in the slot 60 provided in the handle carrier 55. In this position the end of the handle bears against locking slug 68 so that it is held in, compressing the spring 83. The V-shaped recess 91 of the handle 62 is, thus, positioned under the central lug 70 of the locking bracket 67, permitting the locking bracket to drop down so that the V-shaped bottom of the lug 70 rests within recess 91. In this position, the upper end of the lug 70 is out of engagement with the opening 51 in the throttle cam plate 43, and the arcuate guide surfaces 75 of the locking bracket 67 have dropped below the locking tab 84 provided on the front mounting plate 11. Thus, the controller is unlocked and the handles may be moved as permitted by the interlocking rollers.

In FIG. 13, the reverser handle 62 has been removed from the handle carrier 55 which can only be accomplished when the control handles are in the positions shown in FIG. 14; that is, the reverser in Neutral, the throttle at Idle and the dynamic brake Off. Removal of reverser handle 62 causes the lower angles faces of the locking bracket lug 70 to ride up the side of the V-shaped groove 91 of the handle, lifting the locking bracket upwardly so that the upper portion of the lug 70 enters the opening 51 in the throttle cam plate 43. At the same time, the arcuate guide surfaces 75 of the locking bracket 67 move upwardly on either side of the locking tab 84, which is thus captured within the recess 76. As the handle is completely removed, it is followed outwardly by the locking slug 68, moving under the force of the spring 83. The slug moves underneath the lug 70 so that, as the handle is removed, the slug maintains the locking bracket 67 in its upward position which holds the controls in the locked position, as shown. In this position, the direction control mechanism 26 cannot be moved from Neutral because of the interference with the front mounting plate tab 84. The throttle handle 39 and mechanism 24 cannot be moved from Idle because of engagement between the locking bracket lug 70 and the throttle cam plate opening 51. The dynamic brake handle 108 and mechanism 27 cannot be moved from its Off position because of interlock roller 126 which is held in its leftward position as shown in FIG. 14 by engagement of the reverser cam plate 63.

As noted previously, the reverser handle 62 may be removed from the controller when the controls are in the positions of FIG. 14. However, in all other control handle positions, the reverser handle 62 is held in place by engagement with the lug 70 of the locking bracket 67. The locking bracket 67 may only be raised into the locked position, which is necessary to free the handle, when the central lug 70 is opposite the throttle plate opening 51 and the recess 76 of the locking bracket is opposite the tab 84 of the front mounting plate. When the controller has been locked by removal of the reverser handle 62, as shown in FIG. 13, re-installation of the handle 62 in the controller pushes the locking slug 68 rearwardly and restores the controller to the unlocked condition illustrated in FIG. 12.

FIG. 14 further illustrates the operation of the controller detents which includes detent rollers 46 and 117 and interlock roller 127. These detents cooperate with the previously described recesses in the various cam plates to detent the throttle in each of its ten positions, the reverser mechanism in each of its three positions, and the dynamic brake mechanism in its Off and Setup positions, but not during the remainder of its travel.

From the foregoing description it may be seen that the features provided in the preferred embodiment described meet the various objects of the invention by providing a simple, yet effective controller mechanism which simplifies manufacturing by utilizing only two centers of rotation for the control mechanisms, while effectively meeting the requirements of the AAR standards. This is accomplished with a minimum of mechanism. Only two interlock rollers are required, one of which doubles as a detent mechanism, with two additional detent mechanisms also being provided. The operation of the interlock rollers is positive without relying on any spring action, and, while the detent actions utilize springs, the failure of one of these springs would not prevent operation of the locomotive with the controller on a temporary basis until repairs could be made.

In order to aid the locomotive operator to determine visually the positions of the control levers, the throttle and dynamic brake controls are provided with visual indicating means. For this purpose, the throttle shaft carries a guide member 136 (shown in FIG. 4) which supports an arcuate translucent indicator 137 containing position disclosing indicia. The portion of the indicator showing the position of the throttle at any instant may be viewed by the operator through an opening 138 provided in the throttle escutcheon plate 40. The indicator is illuminated by suitable means such as an electric bulb 140 carried by a removable support 141 which may be snapped out of position in the front mounting plate for replacement of the bulb. The support is provided with suitable electric contacts 142 which engage mating electrical connections (not shown) in the controller housing.

Figure 3:
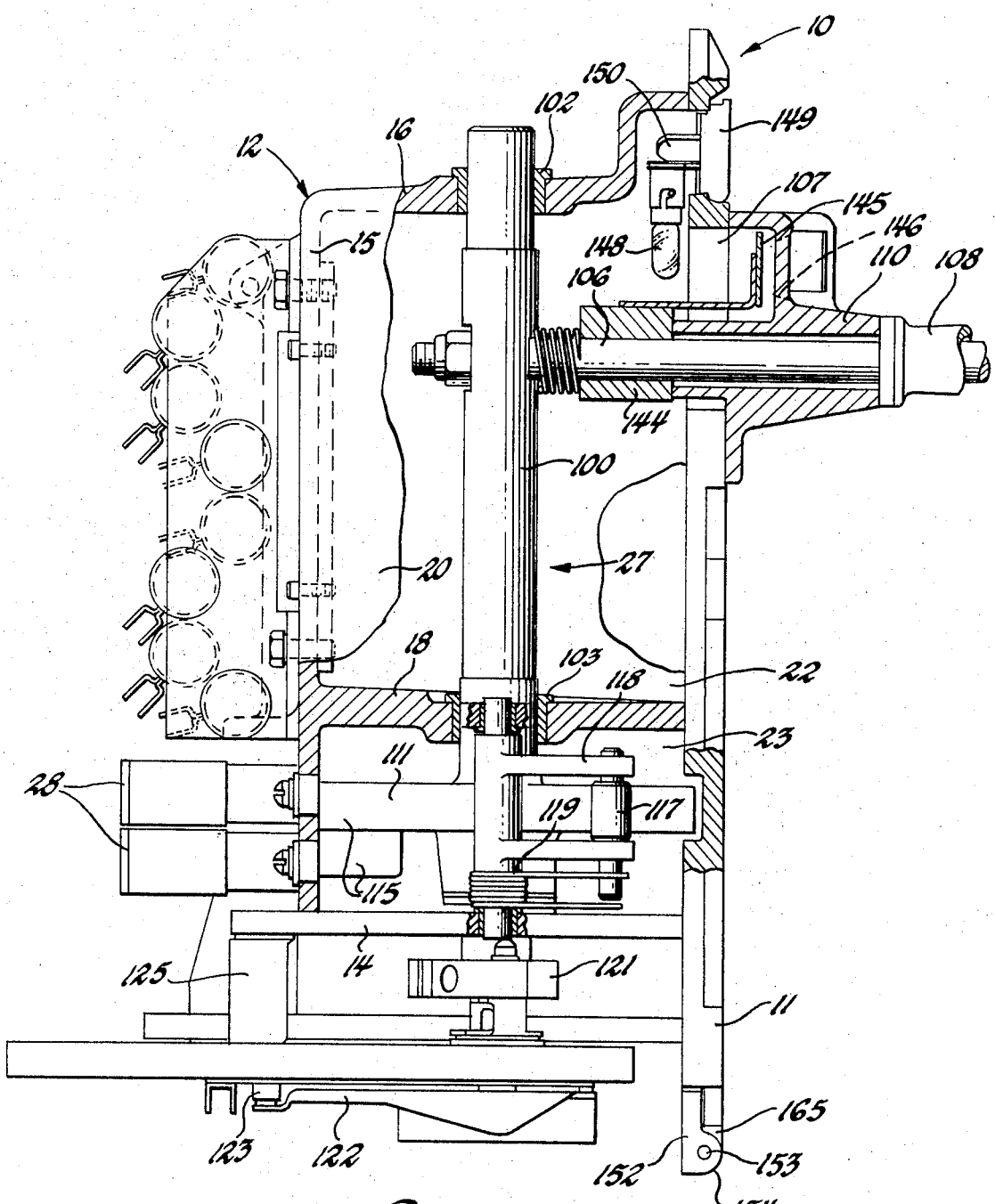
FIG. 3 is a side view from plane of the line 3—3 in FIG. 1 having certain portions in section to illustrate details of the dynamic brake control mechanisms.

As shown in FIG. 3, similar indicating means are provided for the dynamic brake control in the form of a guide member 144 mounted on the brake actuating shaft 106 and supporting an indicator 145. The indicator is observable through an opening 146 in the brake escutcheon plate 110 and is illuminated by an electric bulb 148 carried by a removable support 149 and having electric contacts 150, all of similar construction to the indicating and illuminating means for the throttle control.

The position of the direction control is shown by the position of the reverser handle 62 in the controller.

In order to provide for ease of servicing of the rear portions of the controller, such as by replacement of one of the electric switches 28 or the like, the front mounting plate 11, on which the entire controller assembly is mounted, is provided with a brass hinge 152, which fits flush with the rear surface of the mounting plate and extends the full length of the lower edge thereof. The hinge 152 is connected to the mounting plate by a long pin 153 which extends through aligned openings provided in the three ears 154, 156 and 157 of the hinge and the two mating ears 158 and 160 of the mounting plate. The portions of the pin opening provided in ears 154 and 157 of the hinge are drilled, while the portions provided in hinge ear 156 and mounting plate ears 158 and 160 are formed by oppositely extending slot portions 161 and 162 which open to the front and rear, respectively of the mounting plate and abut at their ends to provide a continuous lateral opening. A similar slot (not shown) is provided opening to the rear of the hinge ear 156. The hinge is also provided with bolt openings 164 by which the hinge may be secured to a locomotive control stand not shown. Cutouts 165, 166 and 168 are provided in the front mounting plate to permit access to the bolt openings for installing and removing the bolts from the front of the controller as it is installed in the control stand.

The edges of the front mounting plate are provided with six bolt openings 169 through which bolts may be installed. These bolts together with bolts installed through openings 164 of the hinge member are used to secure the controller assembly to a locomotive control stand. Subsequent servicing of the rear of the controller may be accomplished by removing the bolts from openings 169 and pivoting the controller downwardly around the hinge pin 153 so that the back portion of the controller is exposed.

While the various features of the invention have been illustrated by reference to a specific preferred embodiment, it should be understood that the inventive concepts disclosed may be utilized in various additional manners and forms which are made apparent by the present disclosure. It is not, therefore, intended to restrict the invention to the specific form of preferred embodiment disclosed, but instead the invention should be given the full scope permitting by the language of the following claims.

What is claimed is:

1. A locomotive controller comprising a housing, a pair of control members mounted in said housing for oscillating movement about a common axis, locking means carried on one of said control members and engagable with the other of said members and with said housing at predetermined relative positions thereof to lock said control members against movement in said housing, and operating handles for each of said control members, the handle for said one control member being removable and cooperating with said locking means such that removal of said handle from said one member engages said locking means with said housing and said other control member while reinstallation of said handle causes disengagement of said locking means from said housing and said other control member, said locking means being arranged to prevent removal of said handle from said one member except when said locking means is engaged.

2. A locomotive controller comprising
a housing,
a throttle control mounted in said housing for oscillating motion about a first axis to a plurality of control positions including Idle and Stop positions, said throttle control including a handle extending outwardly of said housing for movement of said throttle control to its various positions,
a direction control mounted adjacent said throttle control in said housing and arranged for oscillating motion about said first axis to spaced positions including Forward, Neutral and Reverse positions,
a reverser handle installable in said direction control and extending outwardly of said housing for movement of said direction control to its various positions,
interlock means engagable with said throttle control and said direction control and effective to prevent movement of said direction control when said throttle control is in a position other than its Idle and Stop positions,
locking means carried by said direction control and movable therewith, said locking means being engagable with said throttle control and said housing when said direction control is in its Neutral position and said throttle control is in its Idle position to lock said direction and throttle controls in their respective positions, said locking means further cooperating with said housing and said throttle control to prevent engagement therewith when said controls are in any other combination of control positions,
said locking means being operative to permit installation of said reverser handle with said direction control only in its engaged position and to prevent removal of said reverser handle from said direction control when said locking means is not in its engaged position, said reverser handle cooperating with said locking means to move said locking means to its engaged position upon removal of said reverser handle from said direction control and to cause movement of said locking means out of its engaged position upon installation of said reverser handle in said direction control,
whereby said direction control may be moved only when said throttle control is in its Idle or Stop positions, said reverser handle may be removed only when said direction control is in Neutral and said throttle control is in Idle and said controls are locked in their Neutral and Idle positions when said reverser handle is removed.

3. The combination of claim 2 and further comprising a brake control mounted in said housing for oscillating motion about a second axis parallel and spaced from said first axis, said brake control being movable through a plurality of control positions including an Off position,
second interlock means engagable with said brake control, said throttle control and said direction control and operative to prevent movement of said brake control from its Off position except when said direction control is in either its Forward or Reverse position and said throttle control is in its Idle or Stop positions,
whereby said brake control is maintained in its Off position when said throttle and direction controls are locked, as well as when said throttle control is moved from its Idle or Stop positions or said direction control is in Neutral and, when said brake control is moved out of its Off position, said throttle control cannot be advanced from its Idle position and said direction control cannot be moved.

4. A locomotive controller comprising
a housing having an inwardly extending locking tab, first and second control members mounted in said housing for oscillating movement about a common axis,
a first cam plate carried by said first control member and movable therewith, said first cam plate having a lock opening and a generally arcuate cam opening having a wide and narrow portions,
a second cam plate carried by said second control member and movable therewith said second cam plate having a first group of peripheral recesses,
a locking bracket mounted on said second control member, said locking bracket having a pair of arms terminating in spaced arcuate guide surfaces at one end and a central lug mounted between said arms, said bracket being movable to engage said lug with the lock opening of said first cam plate and to receive said housing locking tab between said guide surfaces, when said control members are in predetermined positions, to lock said control members in said predetermined positions,
operating handles for each of said control members, the handle for said second control member being removable and having a recess cooperating with said locking bracket such that removal of said handle from said housing second control member engages said locking bracket with said housing tab and the lock opening of said first control member while reinstallation of said handle causes disengagement of said locking bracket from said housing tab and lock opening, said locking bracket having a cam-like portion engaging the recess in said removable handle and movable out of said handle recess upon engagement of said locking bracket with said housing tab and lock opening to prevent removal of said handle from said second control member except when said locking bracket is so engaged, and a first interlock roller extending through the cam opening of said first cam plate and engagable with said first group of peripheral recesses in said second cam plate, said roller being movable out of said second cam plate recesses only when said roller is in the wide portion of the cam opening of said first cam plate, thereby preventing movement of said second control member when said first control member is positioned with said roller in the narrow portion of said cam opening.

5. A locomotive controller comprising a housing having an inwardly extending locking tab, first and second control members mounted in said housing for oscillating movement about a common axis, a first cam plate carried by said first control member and movable therewith, said cam plate having a lock opening, a generally arcuate cam opening having wide and narrow portions and a peripheral recess, a second cam plate carried by said second control member and movable therewith, said second cam plate having first and second groups of peripheral recesses, said second group consisting of two spaced recesses with an arcuate cam portion therebetween, a locking bracket mounted on said second control member, said locking bracket having a pair of arms terminating in spaced arcuate guide surfaces at one end and a central lug mounted between said arms, said bracket being movable to engage said lug with the lock opening of said first cam plate and to receive said housing locking tab between said guide surfaces, when said control members are in predetermined positions, to lock said control members in said predetermined positions, a third control member mounted in said housing for oscillating movement about a second axis parallel to said common axis, said third control member carrying a third cam plate movable therewith and having a peripheral arcuate cam portion with a recess at one end thereof, operating handles for each of said control members, the handle for said second control member being removable and having a recess cooperating with said locking bracket such that removal of said handle from said housing second control member engages said locking bracket with said housing tab and the lock opening of said first control member while reinstallation of said handle causes disengagement of said locking bracket from said housing tab and lock opening, said locking bracket having a cam-like portion engaging the recess in said removable handle and movable out of said handle recess upon engagement of said locking bracket with said housing tab and lock opening to prevent removal of said handle from said second control member except when said locking bracket is so engaged, a first interlock roller extending through the cam opening of said first cam plate and engagable with said first group of peripheral recesses in said second cam plate, said roller being movable out of said second cam plate recesses only when said roller is in the wide portion of the cam opening of said first cam plate, thereby preventing movement of said second control member when said first control member is positioned with said roller in the narrow portion of said cam opening, and a second interlock roller between the peripheries of said third cam plate and said first and second cam plates and engagable therewith, said second roller being receivable in the recess of said third cam plate and maintained therein by the arcuate cam portion of said second cam plate when said first and second control members are locked by said locking bracket, thereby locking said third control member, movement of said second roller into one of the second group of recesses of said second cam plate and the recess of said first cam plate being required to permit movement of said third control member such that its peripheral cam portion is opposite said second interlock roller, such movement thereby preventing movement of said second control member or of said first control member beyond the limit permitting by said first cam plate recess.

6. The combination of claim 5 and further including spring means biasing said first interlock roller against said second cam plate, whereby said first interlock roller cooperates with the first group of recesses in said second cam plate to detent said second control member, and first and second detent means cooperating wth detent recesses in said first and third cam plates, respectively, to detent said first and third control members.

* * * * *